US008804016B2

(12) United States Patent
Hayashi et al.

(10) Patent No.: US 8,804,016 B2
(45) Date of Patent: Aug. 12, 2014

(54) COLOR IMAGING ELEMENT, IMAGING DEVICE, AND STORAGE MEDIUM STORING AN IMAGING PROGRAM

(71) Applicant: Fujifilm Corporation, Tokyo (JP)

(72) Inventors: Kenkichi Hayashi, Saitama (JP); Hiroshi Endo, Saitama (JP); Noriko Kawamura, Saitama (JP); Takashi Aoki, Saitama (JP); Kazuki Inoue, Saitama (JP)

(73) Assignee: FujiFilm Corporation, Tokyo (JP)

( * ) Notice: Subject to any disclaimer, the term of this patent is extended or adjusted under 35 U.S.C. 154(b) by 0 days.

(21) Appl. No.: 14/031,790

(22) Filed: Sep. 19, 2013

(65) Prior Publication Data

US 2014/0022423 A1     Jan. 23, 2014

Related U.S. Application Data

(63) Continuation of application No. PCT/JP2011/067547, filed on Jul. 29, 2011.

(30) Foreign Application Priority Data

Mar. 24, 2011 (JP) ................................. 2011-066630
Jul. 26, 2011 (JP) ................................. 2011-163309

(51) Int. Cl.
 *H04N 9/04* (2006.01)
 *H04N 9/73* (2006.01)
 *H04N 9/07* (2006.01)
 *H04N 5/232* (2006.01)
 *H04N 5/369* (2011.01)

(52) U.S. Cl.
 CPC .............. *H04N 5/23212* (2013.01); *H04N 9/07* (2013.01); *H04N 9/045* (2013.01); *H04N 5/3696* (2013.01)
 USPC ........ 348/280; 348/224.1; 348/272; 348/273; 348/274; 348/277

(58) Field of Classification Search
 CPC ... H04N 5/23212; H04N 9/045; H04N 5/367; H04N 2209/045; H04N 5/335; H04N 5/347; H04N 5/23254; H04N 5/3458; G03B 13/36; G03B 13/28; G03B 13/32; G03B 13/18; G03B 33/16; G02B 7/36; G02B 7/28
 USPC .............. 348/280, 224.1, 272, 273, 274, 277, 348/345
 See application file for complete search history.

(56) References Cited

U.S. PATENT DOCUMENTS 6,343,146 B1    1/2002    Tsuruoka et al.
6,995,796 B2    2/2006    Taubman (Continued)

FOREIGN PATENT DOCUMENTS

JP          8-23542 A       1/1996
JP          8-23543 A       1/1996

(Continued)

OTHER PUBLICATIONS

International Search Report issued in PCT/JP2011/067547 dated Sep. 6, 2012.

(Continued)

*Primary Examiner* — Twyler Haskins
*Assistant Examiner* — Padma Haliyur
(74) *Attorney, Agent, or Firm* — Birch, Stewart, Kolasch & Birch, LLP

(57) ABSTRACT

An image pickup device includes: a color filter having repeatedly disposed basic array patterns configured with first and second array patterns disposed symmetrically about a point, wherein the first array pattern has a first filter placed at the 4 corner and center pixels of a 3×3 pixel square array, a second filter placed in a line at the horizontal direction center of the square array, and a third filter placed in a line at the vertical direction center of the square array, and the second array pattern has the same placement of the first filter as the first array pattern and has placement of the second filter and placement of the third filter swapped over to that of the first array pattern; and phase difference detection pixels placed at positions corresponding to the first filter at a top and bottom edge sides in the array pattern.

12 Claims, 10 Drawing Sheets

(56) References Cited

U.S. PATENT DOCUMENTS

| | | | |
|---|---|---|---|
| 7,557,842 B2* | 7/2009 | Ohara et al. | 348/280 |
| 2002/0149686 A1 | 10/2002 | Taubman | |
| 2004/0109068 A1 | 6/2004 | Mitsunaga et al. | |
| 2004/0169747 A1 | 9/2004 | Ono et al. | |
| 2006/0203113 A1 | 9/2006 | Wada et al. | |
| 2007/0153104 A1 | 7/2007 | Ellis-Monaghan et al. | |
| 2008/0131028 A1 | 6/2008 | Pillman et al. | |
| 2008/0151083 A1 | 6/2008 | Hains et al. | |
| 2009/0202171 A1* | 8/2009 | Kasahara | 382/275 |
| 2010/0302433 A1 | 12/2010 | Egawa | |
| 2011/0069189 A1 | 3/2011 | Venkataraman et al. | |
| 2012/0025060 A1 | 2/2012 | Iwata | |

FOREIGN PATENT DOCUMENTS

| | | |
|---|---|---|
| JP | 10-243407 A | 9/1998 |
| JP | 11-285012 A | 10/1999 |
| JP | 2000-156823 A | 6/2000 |
| JP | 2000-308080 A | 11/2000 |
| JP | 2004-221839 A | 8/2004 |
| JP | 2004-266369 A | 9/2004 |
| JP | 3592147 B2 | 11/2004 |
| JP | 2005-136766 A | 5/2005 |
| JP | 2007-155929 A | 6/2007 |
| JP | 2007-184904 A | 7/2007 |
| JP | 2007-306490 A | 11/2007 |
| JP | 2008/066698 A2 | 6/2008 |
| JP | 2008-236620 A | 10/2008 |
| JP | 2008-312073 A | 12/2008 |
| JP | 2009-89144 A | 4/2009 |
| JP | 2009-105682 A | 5/2009 |
| JP | 2009-217252 A | 9/2009 |
| JP | 2010-66494 A | 3/2010 |
| JP | 2010-512048 A | 4/2010 |
| JP | 2010-153511 A | 7/2010 |
| JP | 2011-523538 A | 8/2011 |
| WO | 02/056604 A1 | 7/2002 |
| WO | 2009/151903 A2 | 12/2009 |

OTHER PUBLICATIONS

Office Action isssued in Chinese Patent Application 201180022503.3 on May 23, 2013.

Written Opinion of the International Searching Authority issued in PCT/JP2011/067547, dated Sep. 6, 2011.

Written Opinion of the International Searching Authority issued in PCT/JP2012/080898, dated Jan. 22, 2013.

Written Opinion of the International Searching Authority issued in PCT/JP2012/080899, dated Jan. 15, 2013.

Written Opinion of the International Searching Authority issued in PCT/JP2012/081644, dated Jan. 15, 2013.

Written Opinion of the International Searching Authority issued in PCT/JP2012/083583, dated Jan. 29, 2013.

* cited by examiner

FIG.3

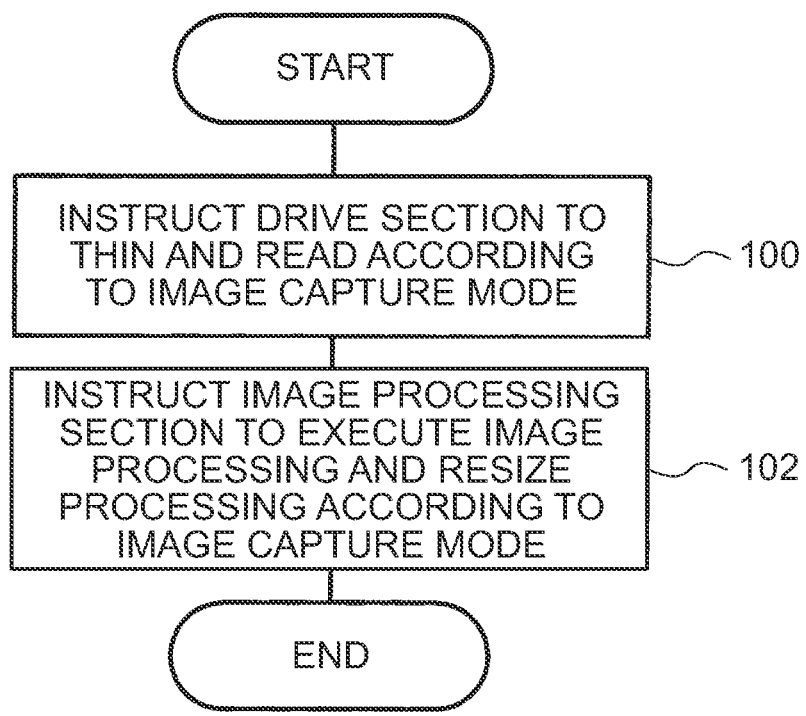

COLOR IMAGING ELEMENT, IMAGING DEVICE, AND STORAGE MEDIUM STORING AN IMAGING PROGRAM

CROSS-REFERENCE TO RELATED APPLICATIONS

This application is a continuation application of International Application No. PCT/JP2011/067547, filed Jul. 29, 2011, the disclosure of which is incorporated herein by reference in its entirety. Further, this application claims priority from Japanese Patent Application No. 2011-066630, filed Mar. 24, 2011, and Japanese Patent Application No. 2011-163309, filed Jul. 26, 2011.

BACKGROUND

1. Technical Field

The present invention relates to a color image pickup device, an imaging apparatus and an image capture program, and in particular to a color image pickup device that includes phase difference detection pixels and to an imaging apparatus and an image capture program of the same.

2. Related Art

For solid state image pickup devices installed in imaging apparatuses such as digital cameras, there are those that, in order to raise Auto Focus (AF) performance have phase difference detection pixels as a portion of the pixels out of many pixels formed on the solid state image pickup device light receiving surface (see for example Patent Documents 1 to 7).

The phase difference detection pixels are, for example similarly to the Patent Documents 1 to 7 listed below, configured by 2 nearby pixels mounted with the same color filter to form pairs, and are provided with light-blocking film openings that are respectively smaller than light-blocking film openings provided to normal pixels. Moreover, the light-blocking film opening provided to one of the phase difference detection pixels configuring a pair is provided eccentrically in a separation direction (for example on the left side) from the other phase difference detection pixel, and the light-blocking film opening of the other phase difference detection pixel is provided eccentrically in the opposite direction (for example on the right side).

During AF operation in an imaging apparatus, the signals are read from the phase difference detection pixels of the solid state image pickup device, a focal point shift amount is derived from the detection signal of the pixel with light-blocking film opening eccentrically placed on the right side, and the detection signal of the pixel with the light-blocking film opening eccentrically placed on the left side, and the focal position of the imaging lens is adjusted.

PATENT DOCUMENTS

Patent Document 1 Japanese Patent Application Laid-Open (JP-A) No. 2000-156823
Patent Document 2 JP-A No. 2007-155929
Patent Document 3 JP-A No. 2009-89144
Patent Document 4 JP-A No. 2009-105682
Patent Document 5 JP-A No. 2010-66494
Patent Document 6 JP-A No. 2008-312073
Patent Document 7 Japanese Patent No. 3592147

The precision of AF operation increases the more phase difference detection pixels there are, however the phase difference detection pixels cannot be increased beyond reason since there is an issue that the phase difference detection pixels cannot be treated in the same way as normal pixels when performing main imaging of a normal imaging subject image, due to their narrow light-blocking film opening and low sensitivity. Moreover, AF precision can sometimes suffer depending on the positions of the phase difference detection pixels.

SUMMARY

The present invention addresses the above issue, and an object thereof is to provide a color image pickup device, an imaging apparatus and an image capture program capable of raising AF precision with phase difference detection pixels.

In order to address the above issue, a color image pickup device of the present invention includes: an image pickup device including plural photoelectric conversion elements arrayed in a horizontal direction and a vertical direction; a color filter that is provided above plural pixels configured by the plural photoelectric conversion elements, the color filter having repeatedly disposed 6×6 pixel basic array patterns configured with a first array pattern and a second array pattern disposed symmetrically about a point, wherein the first array pattern has a first filter corresponding to a first color that contributes most to obtaining a brightness signal placed at the 4 corner and center pixels of a 3×3 pixel square array, a second filter corresponding to a second color different from the first color placed in a line at the horizontal direction center of the square array, and a third filter corresponding to a third color different from the first color and the second color placed in a line at the vertical direction center of the square array, and the second array pattern has the same placement of the first filter as that in the first array pattern and has the placement of the second filter and the placement of the third filter swapped over to that of the first array pattern; and phase difference detection pixels placed at least at positions corresponding to the first filter at a top edge side and a bottom edge side in the basic array pattern.

According to the present invention, the AF precision with phase difference detection pixels can be raised due to configuration with the phase difference detection pixels placed at least at positions corresponding to the first filter at a top edge side and a bottom edge side in the basic array pattern.

Note that, configuration may be made such that a light-blocking section is provided on the phase difference detection pixels, the light-blocking section including a first light-blocking film to block light to a region that is a part of the pixel and to let light through to other regions or a second light-blocking film to block light to part of the pixel and to let light pass through in a region that forms a pair with the light-pass region of the first light-blocking film.

Moreover, configuration may be made such that the first light-blocking film of the light-blocking section blocks light to a pixel horizontal direction left half region, and the second light-blocking film blocks light to a pixel horizontal direction right half region.

Moreover, configuration may be made such that the phase difference detection pixels are respectively placed at positions corresponding to all the first filters of all the basic array patterns in at least a specific region of the image pickup device.

Moreover, configuration may be made such that the phase difference detection pixels are respectively placed at positions corresponding to the first filters at a vertical direction top edge side and bottom edge side of all the basic array patterns in at least a specific region of the image pickup device.

Moreover, configuration may be made such that array lines disposed in the horizontal direction with the first light-blocking film are alternately arrayed in the vertical direction with array lines disposed in the horizontal direction with the second light-blocking film.

Moreover, configuration may be made such that array lines alternately disposed in the horizontal direction in sequence with the first light-blocking film and the second light-blocking film are alternately arrayed in the vertical direction with array lines alternately disposed in the horizontal direction in sequence with the second light-blocking film and the first light-blocking film.

Moreover, configuration may be made such that the first color is green (G), the second color is one color of red (R) or blue (B), and the third color is the other color of red (R) or blue (B).

An imaging apparatus includes: the color image pickup device; a drive section that drives the color image pickup device so as to read phase difference detection pixel data from the phase difference detection pixels; and a focus adjustment section that adjusts focus based on the phase difference detection pixel data.

An imaging apparatus includes: the color image pickup device; a drive section that drives the color image pickup device so as to read phase difference detection pixel data from the phase difference detection pixels and so as to read video generation pixel data from normal pixels at the vertical direction center side of the basic array pattern; a focus adjustment section that adjusts focus based on the phase difference detection pixel data; and a generation section that generates video data based on the video generation pixel data.

An image capture program is an image capture program that causes a computer to function as each section configuring the imaging apparatus.

Advantageous Effects of Invention

According to the present invention, the advantageous effect is exhibited of enabling the AF precision with phase difference detection pixels to be raised.

BRIEF DESCRIPTION OF DRAWINGS

FIG. 3 is a diagram illustrating light-blocking portion placement according to a first exemplary embodiment.

FIG. 4 is a flow chart of processing executed in a controller.

FIG. 6 is a diagram illustrating light-blocking portion placement according to a second exemplary embodiment.

FIG. 10 is a diagram to explain a case in which pixel data of phase difference detection pixels is corrected by average value correction.

DESCRIPTION OF EMBODIMENTS

Explanation follows regarding exemplary embodiments of the present invention, with reference to the drawings.

First Exemplary Embodiment

Figure 1:
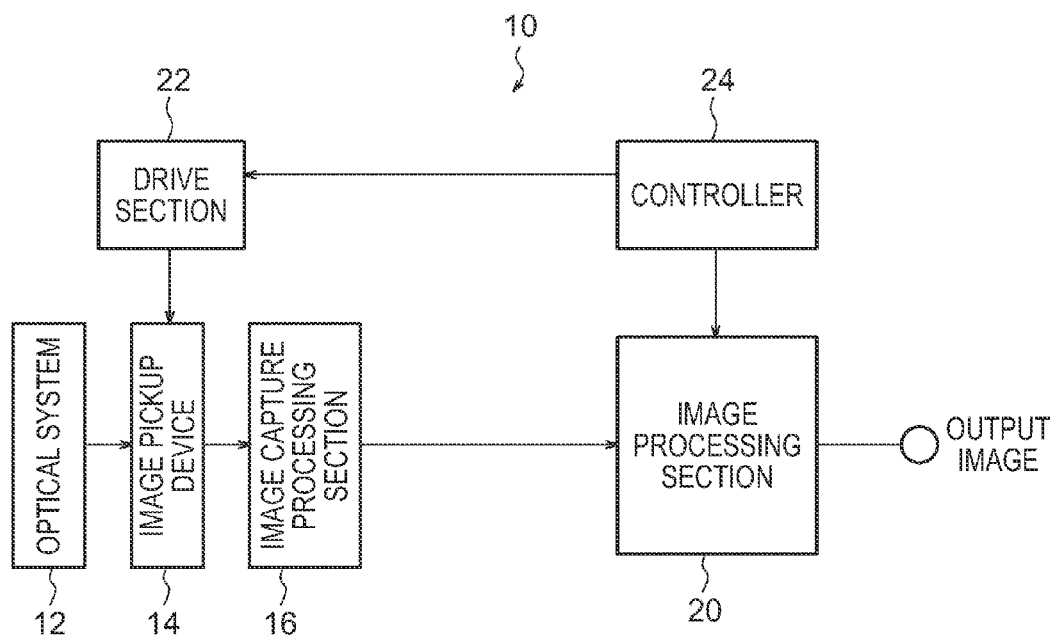
FIG. 1 is a schematic block diagram of an imaging apparatus.

FIG. 1 is a schematic block diagram illustrating an imaging apparatus 10 according to the present exemplary embodiment. The imaging apparatus 10 is configured including an optical system 12, an image pickup device 14, an image capture processing section 16, an image processing section 20, a drive section 22, and a controller 24.

The optical system 12 is configured including for example a lens set configured from plural optical lenses, an aperture adjustment mechanism, a zoom mechanism, and an automatic focusing mechanism.

The image pickup device 14 is what is referred to as a 1-chip image pickup device configured by an image pickup device, such as for example a Charge Coupled Device (CCD) or a Complementary Metal Oxide Semiconductor (CMOS) containing plural photoelectric conversion elements arrayed in the horizontal direction and vertical direction, with a color filter disposed above the image pickup device.

Figure 2:
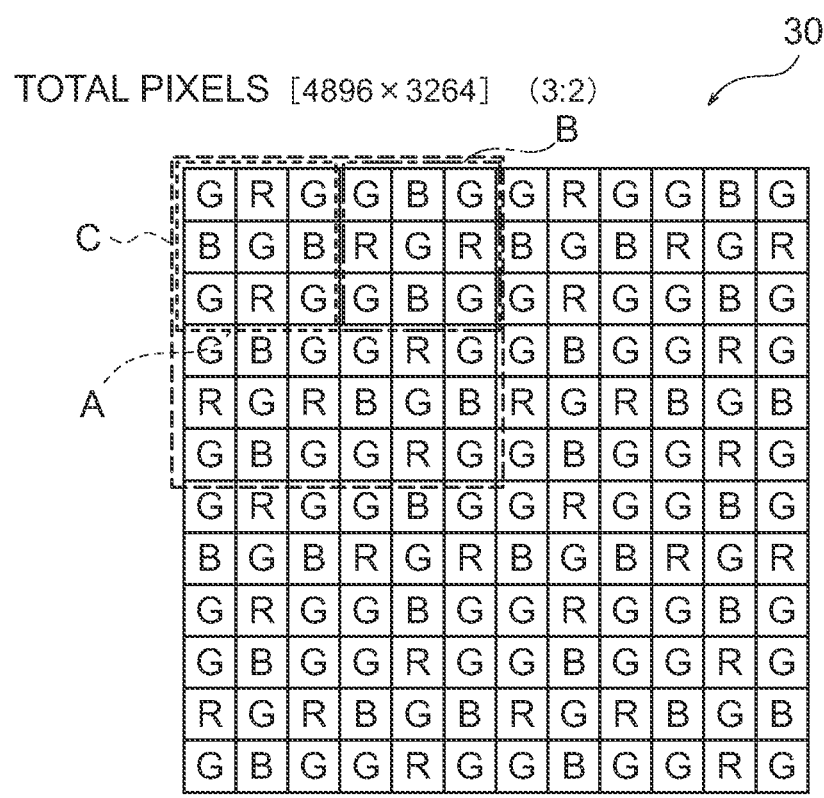
FIG. 2 is a configuration diagram of a color filter according to the present invention.

FIG. 2 illustrates a portion of a color filter 30 according to the present invention. Note that (4896×3264) pixels are provided as an example of the number of pixels with an aspect ratio of 3:2, however there is no limitation to such a number of pixels and aspect ratio. As illustrated in the drawing, the color filter 30 is a color filter having a repeatedly disposed 6×6 pixel basic array pattern C configured with a first array pattern A and a second array pattern B disposed symmetrically about a point, wherein the first array pattern A has a first filter G (referred to below as G filter) corresponding to G (green) that contributes most to obtaining a brightness signal placed at the 4 corner and center pixels of a 3×3 pixel square array, a second filter R (referred to below as R filter) corresponding to R (red) placed in the line at the horizontal direction center of the square array, and a third filter B (referred to below as B filter) corresponding to B (blue) placed in the line at the vertical direction center of the square array, and the second array pattern B has the same placement of the G filter as that of the first array pattern A and has the placement of the R filter and the placement of the B filter swapped over thereto.

Namely, the color filter 30 has the following features (1), (2), (3), (4) and (5).

Feature (1)

The color filter 30 illustrated in FIG. 2 includes the basic array pattern C formed from square placement patterns corresponding to 6×6 pixels, with the basic array pattern C disposed so as to repeat in both the horizontal direction and the vertical direction. Namely, the color filter array is an array in which each of the filters R, G, B (the R filter, G filter, B filter) has a specific periodicity.

Arraying the R filter, G filter and B filter thus with such a specific periodicity, enables processing to be performed in a repeating pattern such as during synchronization (interpolation) processing of R, G, B signals read from the color image pickup device.

Moreover, when images are reduced by thinning processing in basic array pattern C units, the color filter array of the thinning processed reduced image can be made similar to the color filter array prior to thinning processing, enabling a common processing circuit to be employed.

Feature (2)

The color filter 30 illustrated in FIG. 2 has the G filter, that corresponds to the color contributing the most to obtaining a brightness signal (the color G in the present exemplary embodiment), placed in each line in the horizontal direction, vertical direction and diagonal directions of the color filter array.

The G filter corresponding to the brightness system pixels are placed in every line in the horizontal direction, vertical direction and diagonal directions of the color filter array, thereby enabling the reproduction precision of synchronization processing to be raised in the high frequency region, irrespective of the high frequency direction.

Feature (3)

In the color filter 30 illustrated in FIG. 2, the R filter and B filter, that correspond to the two or more other colors than the G color (the R and B colors in the present exemplary embodiment), are placed in each line in the horizontal direction and vertical direction of the color filter array.

The R filter and B filter are placed in each line in the horizontal direction and vertical direction of the color filter array, thereby enabling color moire (false color) generation to be suppressed. Thus an optical low pass filter for suppressing false color generation may be omitted from placement on the optical path of the optical system from the incident face to the imaging plane. Moreover, even in cases in which an optical low pass filter is applied, one can be employed that has a weak action to cut the high frequency components to prevent false color generation, enabling deterioration of resolution to be avoided.

The basic array pattern C such as illustrated in FIG. 2 can be considered as an array of alternate first array pattern A and second array pattern B in the horizontal direction and vertical direction, wherein the first array pattern A is the 3×3 pixels surrounded by the frame of the broken line, and the second array pattern B is the 3×3 pixels surrounded by the frame of the single dot intermittent line.

The first array pattern A and the second array pattern B both have the G filters for the respective brightness system pixels placed at their 4 corners and center, so as to be placed along their two diagonals. Moreover, in the first array pattern A, the B filters are arrayed in the horizontal direction on each side of the central G filter, and the R filters are arrayed in the vertical direction. However, in the second array pattern B, the R filters are arrayed on each side of the central G filter in the horizontal direction, and the B filters are arrayed in the vertical direction. Namely, the first array pattern A and the second array pattern B have reverse positional relationships for the R filters and the B filters, but have the same placement otherwise.

Figure 8:
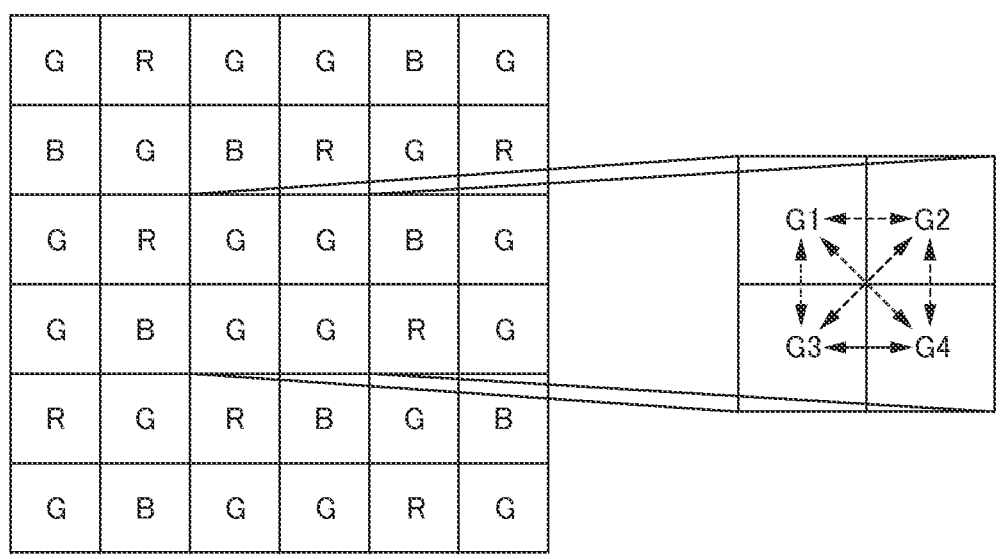
FIG. 8 is a diagram to explain a method for determining a correlation direction from pixel values of G pixels of 2×2 pixels contained in a color filter.

Moreover, the G filters at the 4 corners of the first array pattern A and the second array pattern B configure G filters that are arrayed in a square array corresponding to 2×2 pixels by disposing the first array pattern A and the second array pattern B alternately along the horizontal and vertical directions as illustrated in FIG. 8.

Feature (4)

The color filter 30 illustrated in FIG. 2 contains a square array corresponding to 2×2 pixels formed from the G filters.

As illustrated in FIG. 8, by extracting the 2×2 pixels formed from the G filters, and deriving the difference in absolute value of the pixel values of the G pixels in the horizontal direction, the difference in absolute value of the pixel values of the G pixels in the vertical direction, and the difference in absolute value of the pixel values of the G pixels in the diagonal directions (sloping up to the right and sloping up to the left), determination can be made that there is correlation in the direction with the smallest difference in absolute value out of the horizontal direction, vertical direction and diagonal directions.

Namely, according to the color filter array, the data of the G pixels with the smallest inter pixel separations are employed, thereby enabling determination of the direction with the highest correlation out of the horizontal direction, vertical direction and diagonal directions. The result of this directional determination can then be employed in interpolation processing from the peripheral pixels (synchronization processing).

Feature (5)

The basic array pattern C of the color filter 30 illustrated in FIG. 2 has point symmetry about the center of the basic array pattern C (the center of the 4 G filters). Moreover, as illustrated in FIG. 2, the first array pattern A and the second array pattern B inside the basic array pattern C also each have respective point symmetry about the G filters at their respective centers.

Such symmetry enables the circuit scale of a later stage processing circuit to be made smaller and to be simplified.

Figure 9:
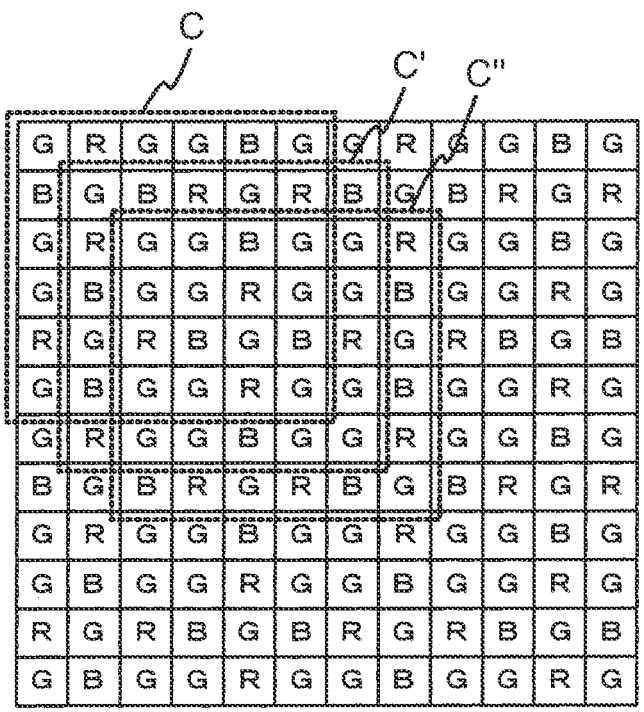
FIG. 9 is a diagram to explain principles of a basic array pattern contained in a color filter.

In the basic array pattern C as illustrated in FIG. 9, the color filter arrays of the first and third lines out of the first to sixth horizontal direction lines are GRGGBG, the color filter array of the second line is BGBRGR, the color filter arrays of the fourth and sixth lines are GBGGRG, and the color filter array of the fifth line is RGRBGB.

In FIG. 9, taking a shifted basic array pattern C' as the basic array pattern C shifted respectively by 1 pixel each in the horizontal direction and vertical direction, and a shifted basic array pattern C" shifted respectively by 2 pixels each, then the same color filter array results from repeatedly disposing the basic array pattern C', C" along the horizontal direction and vertical direction.

Namely, plural basic array patterns exist that enable configuration of the color filter array illustrated in FIG. 9 by repeatedly disposing basic array patterns in the horizontal direction and vertical direction. In the present exemplary embodiment, the basic array pattern C that is the basic array pattern with point symmetry is, for convenience, referred to as the basic array pattern.

Figure 3:
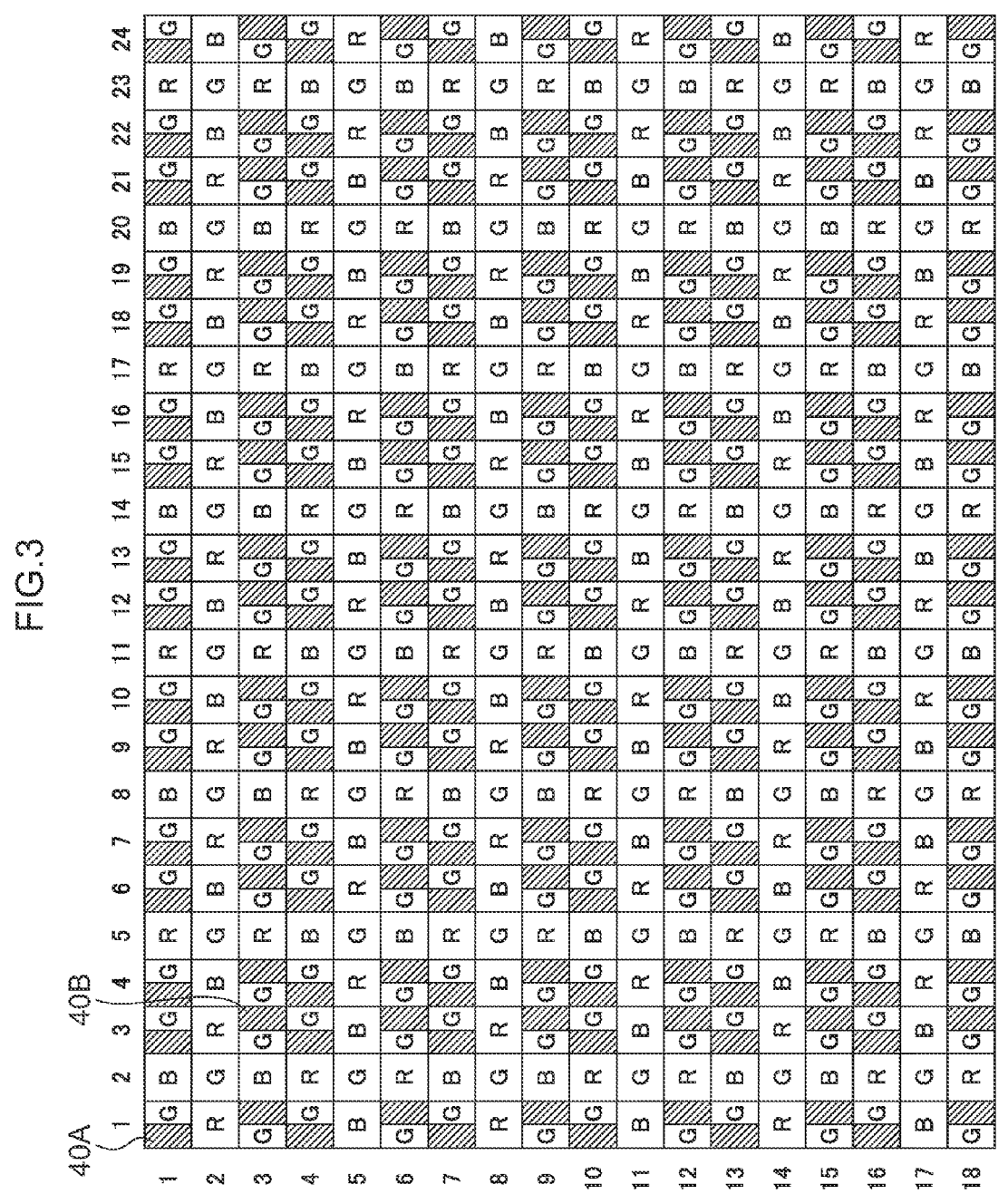

Note that in FIG. 3 the light-blocking portions 40 are provided to all of the basic array patterns C, however there is no limitation thereto, and configuration may be made such that the light-blocking portions 40 are only provided to basic array patterns C inside a specific region of a section of the image pickup device. This also applies to the other exemplary embodiments described below.

In order to perform AF control in the imaging apparatus 10 with what is referred to as a phase difference method, the image pickup device 14 has phase difference detection pixels placed in a predetermined pattern. Light-blocking portions 40 containing light-blocking films 40A that block light to the horizontal direction left half of a pixel, and light-blocking films 40B that block light to the horizontal direction right half of a pixel are formed on the phase difference detection pixels as illustrated in FIG. 3. In phase difference AF control, a phase shift amount is detected based on pixel data from the phase difference detection pixels provided with the light-blocking films 40A and based on pixel data from the phase difference detection pixels provided with the light-blocking films 40B. The focal position of the imaging lens is then adjusted based thereon.

The light-blocking portions 40 in the present exemplary embodiment, as illustrated in FIG. 3, are provided on the phase difference detection pixels where the G filter is placed at the vertical direction top edge side and bottom edge side of all of the basic array patterns C. Namely, the light-blocking portions 40 are provided on the phase difference detection pixels where the G filter is placed at the 4 corners of the first array patterns A and the second array patterns B. In other words, the light-blocking portions 40 are provided on the 2×2 phase difference detection pixels at the center of all the basic array patterns C.

In cases in which phase difference AF control is performed, the precision of AF control is better when the phase difference detection pixels are adjacent to each other and the phase difference detection pixels are placed in the vertical direction.

Thus in the present exemplary embodiment, the light-blocking portions 40 are provided on the all the phase difference detection pixels placed with the G filters, and the phase difference detection pixels are adjacent to each other and placed in the vertical direction, thereby enabling the precision of phase difference AF control to be raised.

The image capture processing section 16 subjects the image capture signals that have been output from the image pickup device 14 to predetermined processing, such as amplification processing and correlated double sampling, and A/D conversion processing, then outputs these as pixel data to the image processing section 20.

The image processing section 20 subjects the pixel data that has been output from the image capture processing section 16 to what is referred to as synchronization processing. Namely, for all the pixels, interpolation is performed of pixel data for colors other than the corresponding respective color from pixel data of peripheral pixels, so as to generate R, G, B pixel data for all pixels. Then, what is referred to as YC conversion processing is performed to the generated R, G, B pixel data, to generate brightness data Y and color difference data Cr, Cb. Then resizing processing is performed to re-size these signals to a size according to the image capture mode.

The drive section 22 performs for example driving to read image capture signals from the image pickup device 14 according to instruction from the controller 24.

The controller 24 performs overall control of the drive section 22 and the image processing section 20 according to the image capture mode. Although discussed in detail later, put briefly the controller 24 instructs the drive section 22 to read image capture signals with a reading method corresponding to the image capture mode, and instructs the image processing section 20 to perform image processing corresponding to the image capture mode.

Since, depending on the image capture mode, there is a need to read thinned image capture signals from the image pickup device 14, the controller 24 instructs the drive section 22 so as to thin and read image capture signals using a thinning method corresponding to the instructed image capture mode.

Included as image capture modes are a still image mode that captures still images, and video modes such as an HD video mode that thins the captured image and generates High Definition (HD) video data at a comparatively high definition and records this on a recording medium such as a memory card, not illustrated in the drawings, and a through video mode (live view mode) in which a captured image is thinned and a through video of comparatively low definition is output to a display section, not illustrated in the drawings.

Explanation next follows of operation of the present exemplary embodiment, regarding processing executed by the controller 24, with reference to the flow chart of FIG. 4.

Note that the processing illustrated in FIG. 4 is executed when execution of imaging corresponding to the image capture mode is instructed.

First, at step 100, the drive section 22 is instructed to read pixel data by a thinning method corresponding to the image capture mode.

For example, for a video mode such as an HD video mode or through video mode, since video data is generated whilst performing phase difference AF control, at least some of the phase difference detection pixels provided with the light-blocking films 40A and the light-blocking films 40B are read, namely at least some of the lines provided with the light-blocking films 40A and the light-blocking films 40B out of the $(6n+1)^{th}$, the $(6n+3)^{th}$, the $(6n+4)^{th}$ and $(6n+6)^{th}$ vertical direction lines in FIG. 3 (wherein n=0, 1, 2, and so on), are read. Phase difference AF control is performed based on the pixel data of these lines, and the other $(6n+2)^{th}$ and $(6n+5)^{th}$ lines, namely at least some of the normal pixel lines, are read and video data generated. During generation of this video data, interpolation is performed for the phase difference detection pixels from the pixel data of the normal pixels in their periphery.

As illustrated in FIG. 3, in the present exemplary embodiment the light-blocking portions 40 are provided on all of the phase difference detection pixels that are placed with the G filter. The phase difference detection pixels are accordingly adjacent to each other and disposed in the vertical direction, thereby enabling the precision of phase difference AF control to be raised.

At step 102, the image processing section 20 is instructed to execute image processing (synchronization processing and YC conversion processing) and resizing processing corresponding to the imaging mode. The image processing section 20 accordingly performs the YC conversion processing and the resizing processing described above.

Note that the controller 24 may be configured with a computer that includes a CPU, ROM, RAM and non-volatile ROM. In such cases a processing program for the above processing may, for example, be pre-stored on the non-volatile ROM, and then executed by reading into the CPU.

Figure 5A:
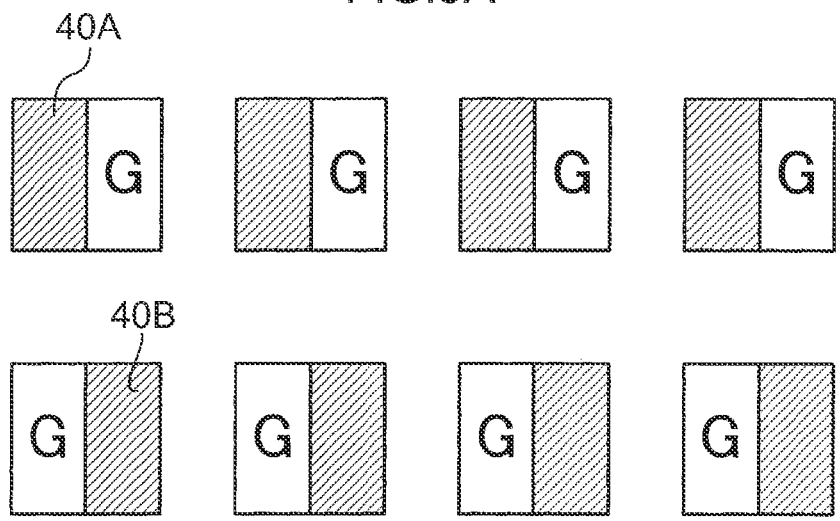
FIG. 5A is a diagram to explain a placement pattern of light-blocking film.
Figure 5B:
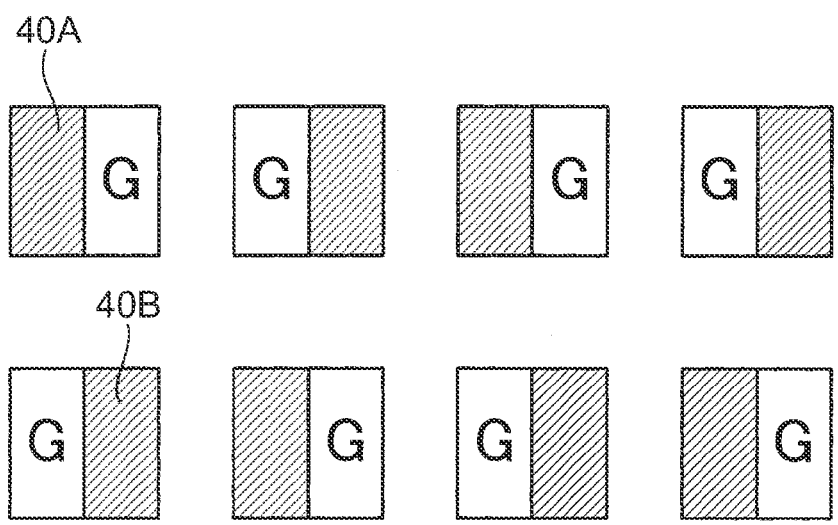
FIG. 5B is a diagram to explain a placement pattern of light-blocking film.

Note that in the present exemplary embodiment, as illustrated in FIG. 3, 5A, explanation is given of a case in which horizontal direction array lines placed with the light-blocking films 40A are alternately disposed in the vertical direction with horizontal direction array lines placed with the light-blocking films 40B. However, as illustrated in FIG. 5B, configuration may be made with array lines of the light-blocking films 40A and the light-blocking films 40B alternately placed in this sequence along the horizontal direction, alternately disposed in the vertical direction with array lines of the light-blocking films 40B and the light-blocking films 40A alternately placed in this sequence along the horizontal direction. Note that only the phase difference detection pixels are illustrated in FIGS. 5A and FIG. 5B. In the placement illustrated in FIG. 5B, since this results in diagonal placement of both the light-blocking films 40A and the light-blocking films 40B, it is possible to focus with good precision when for example capturing an image of a subject that contains diagonal lines. This also applies in the following exemplary embodiments.

Second Exemplary Embodiment

Explanation next follows regarding a second exemplary embodiment of the present invention. Note that the same reference numerals are allocated to portions similar to those of the first exemplary embodiment, and detailed explanation thereof is omitted.

Figure 6:
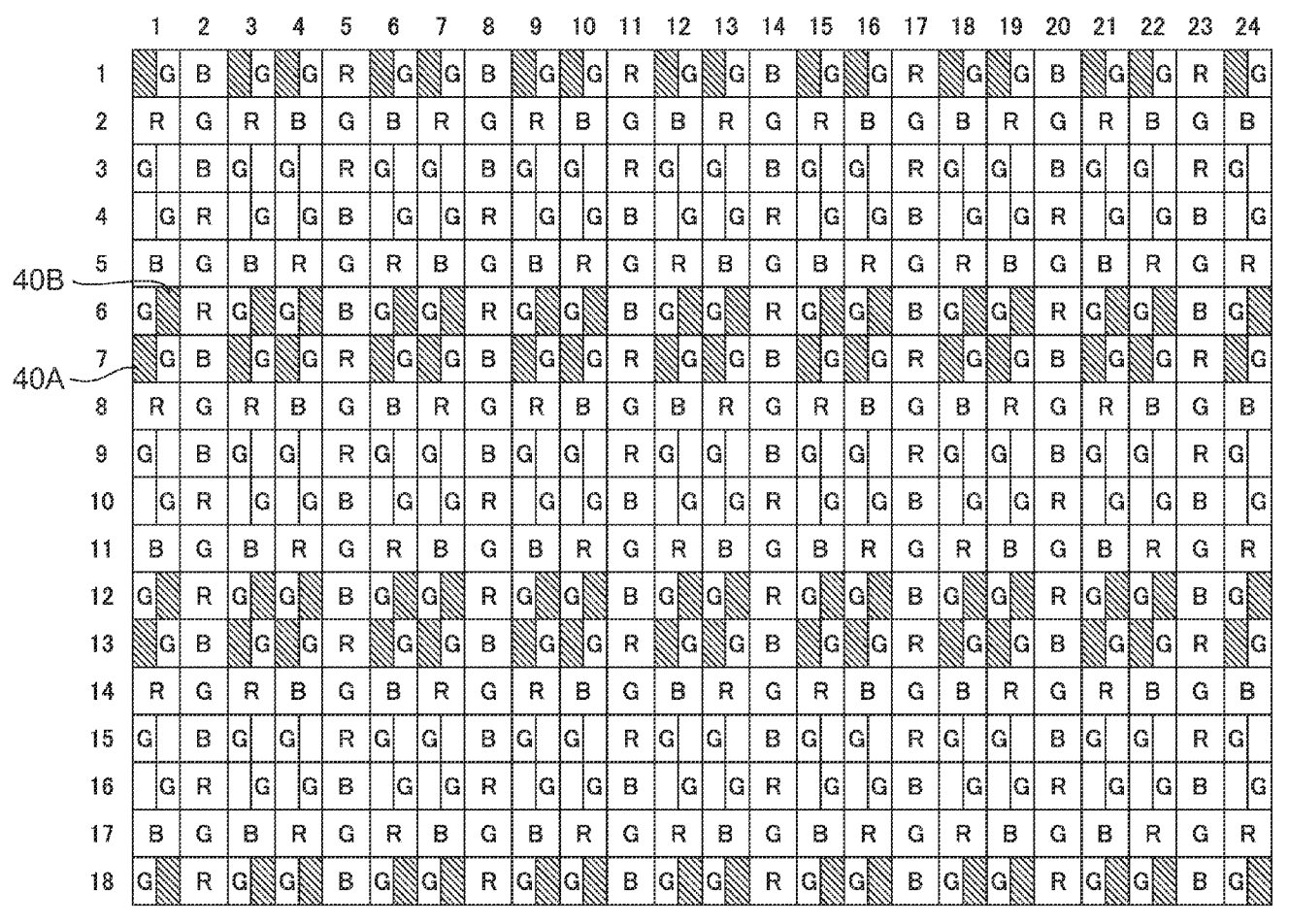

FIG. 6 illustrates a placement of light-blocking films 40A, 40B according to the present exemplary embodiment. A point of difference of the present exemplary embodiment to the first exemplary embodiment is the placement of the light-blocking films 40A, 40B.

As illustrated in FIG. 6, in the present exemplary embodiment the light-blocking portions 40 are respectively provided on the phase difference detection pixels placed with the G filters on the vertical direction top edge side and bottom edge side of all the basic array patterns C. Namely, in the example illustrated in FIG. 6, there are no light-blocking films 40A, 40B placed in the $(6n+3)^{th}$ and $(6n+4)^{th}$ vertical direction lines (n=0, 1, 2, and so on).

In such cases, when the image capture mode is a video mode, the controller 24 reads pixel data of the phase difference detection pixels in the lines placed with the light-blocking films 40A, 40B and performs phase difference AF control, and also reads pixel data of normal pixels not placed with the light-blocking films 40A, 40B, and generates video data.

Thus in the present exemplary embodiment, the pixel data from the phase difference detection pixels is only employed for phase difference AF control, and is not used in generating video data and so there is no need for interpolation from the peripheral pixels. Moreover, the video data is generated from pixel data of normal pixels. Thus the processing speed for phase difference AF control can be raised in comparison to cases in which the phase difference detection pixels are generated based on video data. Moreover, the processing speed for video data generation can be raised in comparison to cases in which interpolated video data is generated.

Note that in each of the above exemplary embodiments, explanation has been given of examples of color filter arrays with the 3 primary color RGB color filters, however the types of color filter are not limited thereto.

Moreover, in each of the above exemplary embodiments, explanation has been given of configurations in which the phase difference detection pixels are provided with the light-blocking films 40A that block light to the horizontal direction left half of pixels or the light-blocking films 40B that block light to the horizontal direction right half of pixels, however there is no limitation to these light-blocking regions, as long as the light-blocking films 40A block light to a region that is a part of the phase difference detection pixels and let light through to other regions, and the light-blocking films 40B block light to part of the phase difference detection pixels and let light pass through in a region that forms a pair with the light-pass region of the light-blocking films 40A.

Figure 7:
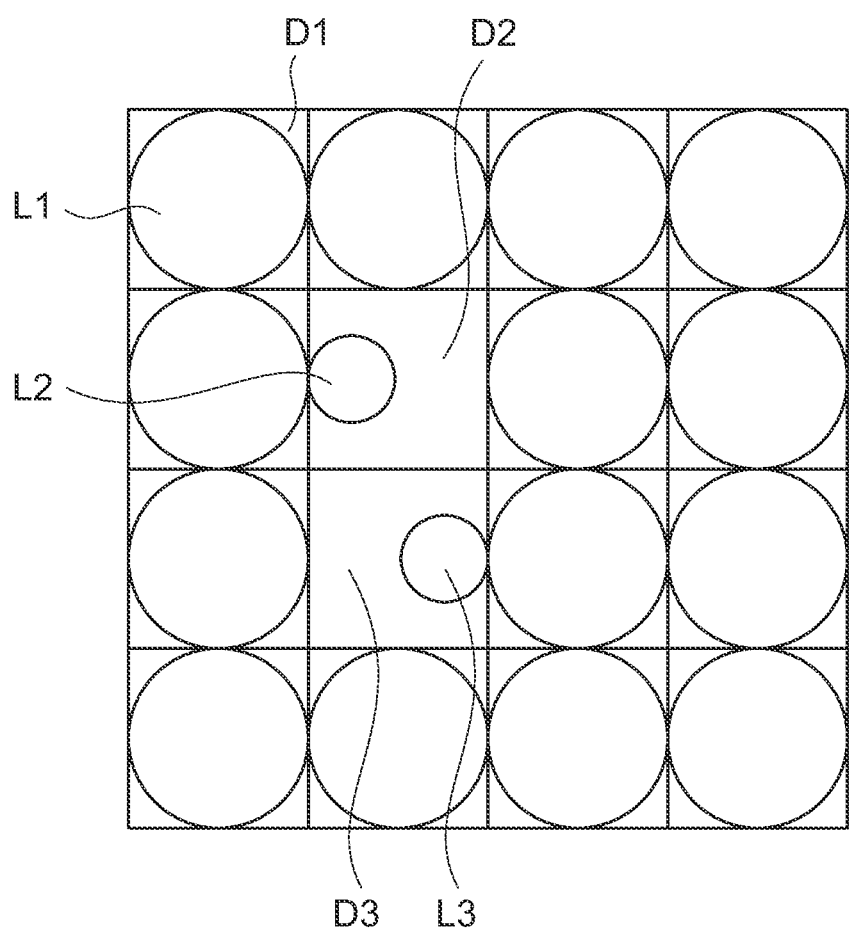
FIG. 7 is a diagram to explain a modified example of phase difference detection pixels.

Moreover, in each of the above exemplary embodiments, explanation has been given of a configuration in which the light-blocking films are provided on the phase difference detection pixels, however there is no limitation thereto. For example, the phase difference detection pixels may be formed by adopting the configuration described in Japanese Patent Application 2009-227338 incorporated by reference herein. Namely, a configuration in which an image pickup device is configured by top microlenses, inner microlenses, and the light receiving elements of similar shape, configured to include first pixels D1 that receive light rays that have passed through the entire region of the imaging lens eye, second pixels D2 that receive only light rays that passed through a portion of a half region of the imaging lens eye, and third pixels D3 that receive only light rays that have passed through a portion of a half region of the imaging lens eye that is different to the second pixels D2. Then, as illustrated in FIG. 7, top microlenses L2, L3 are disposed on the second pixels D2 and the third pixels D3, the top microlenses L2, L3 having a smaller diameter than top microlenses L1 for the first pixels D1 and being respectively shifted in different directions with respect to the optical axes of the inner microlenses. The top microlenses and the light receiving elements are disposed shifted with respect to each other. The second pixels D2 and the third pixels D3 can accordingly be formed in this manner as the phase difference detection pixels. The present invention is also applicable to such a configuration. Moreover, depending on the configuration of the image pickup device, an embodiment may also be implemented without provision of the inner lenses. Moreover, the configuration of the phase difference pixels is not limited to the configuration described above, and it is possible to substitute any configuration capable of partitioning the eye.

Third Exemplary Embodiment

Explanation next follows regarding a third exemplary embodiment of the present invention.

Since phase difference detection pixels have a lower sensitivity than normal pixels, and their characteristics also differ, there is a need to correct the pixel data from phase difference detection pixels when the pixel data of the phase difference detection pixels is employed for a still image or a video image. Explanation follows regarding a pixel data correction method for phase difference detection pixels in the present exemplary embodiment.

As correction methods, two types of method are known, average value correction and gain correction. Average value correction is a method in which an average value of the pixel values of normal pixels at the periphery of the phase difference detection pixels is taken as pixel data for these phase difference detection pixels. Gain correction is a method by which pixel data for the phase difference detection pixels is raised by multiplying pixel data for the phase difference detection pixels by a specific gain equivalent to the difference in level between the normal pixels and the phase difference detection pixels.

Figure 10:
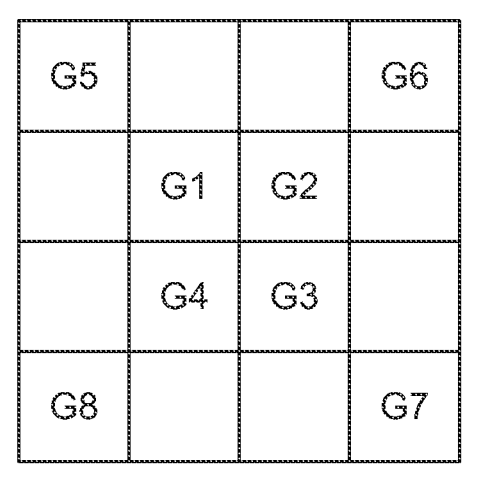

FIG. 10 illustrates G pixel placement within 4×4 pixels centered on 2×2 G pixels at the center of a basic array pattern C. The central 2×2 G pixels in FIG. 10 are respectively G1, G2, G3, G4, clockwise from the top left, and the G pixels peripheral thereto are respectively G5, G6, G7, G8, clockwise from the top left.

The phase difference detection pixels are placed on each of the pixels G1, G2, G3 and G4, as illustrated in FIG. 3 and FIG. 6. Then, for example, when trying to average value correct the G1 pixel data it would be conceivable to perform correction using the average value of the pixel data of the normal pixels G5, G6 and G8. However G6 and G8 are not pixels adjacent to G1.

Thus in the present exemplary embodiment, substitution correction is performed by substituting the pixel data of phase difference detection pixels for the pixel data of adjacent normal pixels.

Specifically, the G1 pixel data is substituted for the adjacent G5 pixel data, the G2 pixel data is substituted for the adjacent G6 pixel data, the G3 pixel data is substituted for the adjacent G7 pixel data, and the G4 pixel data is substituted for the adjacent G8 pixel data.

Due to the above, the pixel data of the phase difference detection pixels is corrected by substitution for the pixel data of adjacent normal pixels.

Note that whether a better image is obtained by performing gain correction or substitution correction sometimes differs depending on the contents of the captured image. Consequently, use of gain correction or average value correction may be chosen according to the contents of the captured image.

What is claimed is:

1. A color image pickup device comprising:
   an image pickup device comprising a plurality of photoelectric conversion elements arrayed in a horizontal direction and a vertical direction;
   a color filter that is provided above a plurality of pixels configured by the plurality of photoelectric conversion elements, the color filter having repeatedly disposed 6×6 pixel basic array patterns configured with a first array pattern and a second array pattern disposed symmetrically about a point, wherein the first array pattern has a first filter corresponding to a first color that contributes most to obtaining a brightness signal placed at the 4 corner and center pixels of a 3×3 pixel square array, a second filter corresponding to a second color different from the first color placed in a line at the horizontal direction center of the square array, and a third filter corresponding to a third color different from the first color and the second color placed in a line at the vertical direction center of the square array, and the second array pattern has the same placement of the first filter as that in the first array pattern and has the placement of the second filter and the placement of the third filter swapped over to that of the first array pattern; and phase difference detection pixels placed at least at positions corresponding to the first filter at a top edge side and a bottom edge side in the basic array pattern.

2. The color image pickup device of claim 1, wherein a light-blocking section is provided on the phase difference detection pixels, the light-blocking section comprising a first light-blocking film to block light to a region that is a part of the pixel and to let light through to other regions or a second light-blocking film to block light to part of the pixel and to let light pass through in a region that forms a pair with the light-pass region of the first light-blocking film.

3. The color image pickup device of claim 2, wherein the first light-blocking film of the light-blocking section blocks light to a pixel horizontal direction left half region, and the second light-blocking film blocks light to a pixel horizontal direction right half region.

4. The color image pickup device of any one of claim 1, wherein the phase difference detection pixels are respectively placed at positions corresponding to all the first filters of all the basic array patterns in at least a specific region of the image pickup device.

5. The color image pickup device of any one of claim 1, wherein the phase difference detection pixels are respectively placed at positions corresponding to the first filters at a vertical direction top edge side and bottom edge side of all the basic array patterns in at least a specific region of the image pickup device.

6. The color image pickup device of any one of claim 2, wherein array lines disposed in the horizontal direction with the first light-blocking film are alternately arrayed in the vertical direction with array lines disposed in the horizontal direction with the second light-blocking film.

7. The color image pickup device of any one of claim 2, wherein array lines alternately disposed in the horizontal direction in sequence with the first light-blocking film and the second light-blocking film are alternately arrayed in the vertical direction with array lines alternately disposed in the horizontal direction in sequence with the second light-blocking film and the first light-blocking film.

8. The color image pickup device of any one of claim 1, wherein the first color is green (G), the second color is one color of red (R) or blue (B), and the third color is the other color of red (R) or blue (B).

9. An imaging apparatus comprising:
the color image pickup device of any one of claim 1;
a drive section that drives the color image pickup device so as to read phase difference detection pixel data from the phase difference detection pixels; and
a focus adjustment section that adjusts focus based on the phase difference detection pixel data.

10. An imaging apparatus comprising:
the color image pickup device of claim 5;
a drive section that drives the color image pickup device so as to read phase difference detection pixel data from the phase difference detection pixels and so as to read video generation pixel data from normal pixels at the vertical direction center side of the basic array pattern;
a focus adjustment section that adjusts focus based on the phase difference detection pixel data; and
a generation section that generates video data based on the video generation pixel data.

11. A non-transitory storage medium storing an imaging program that causes a computer to execute processing function as each section configuring the imaging device of claim 9.

12. A non-transitory storage medium storing an imaging program that causes a computer to execute processing function as each section configuring the imaging device of claim 10.

* * * * *